Sept. 7, 1926.
J. CODER ET AL
1,598,675
TRAILER HAVING FOUR STEERING WHEELS
Filed Oct. 9, 1925     2 Sheets-Sheet 1
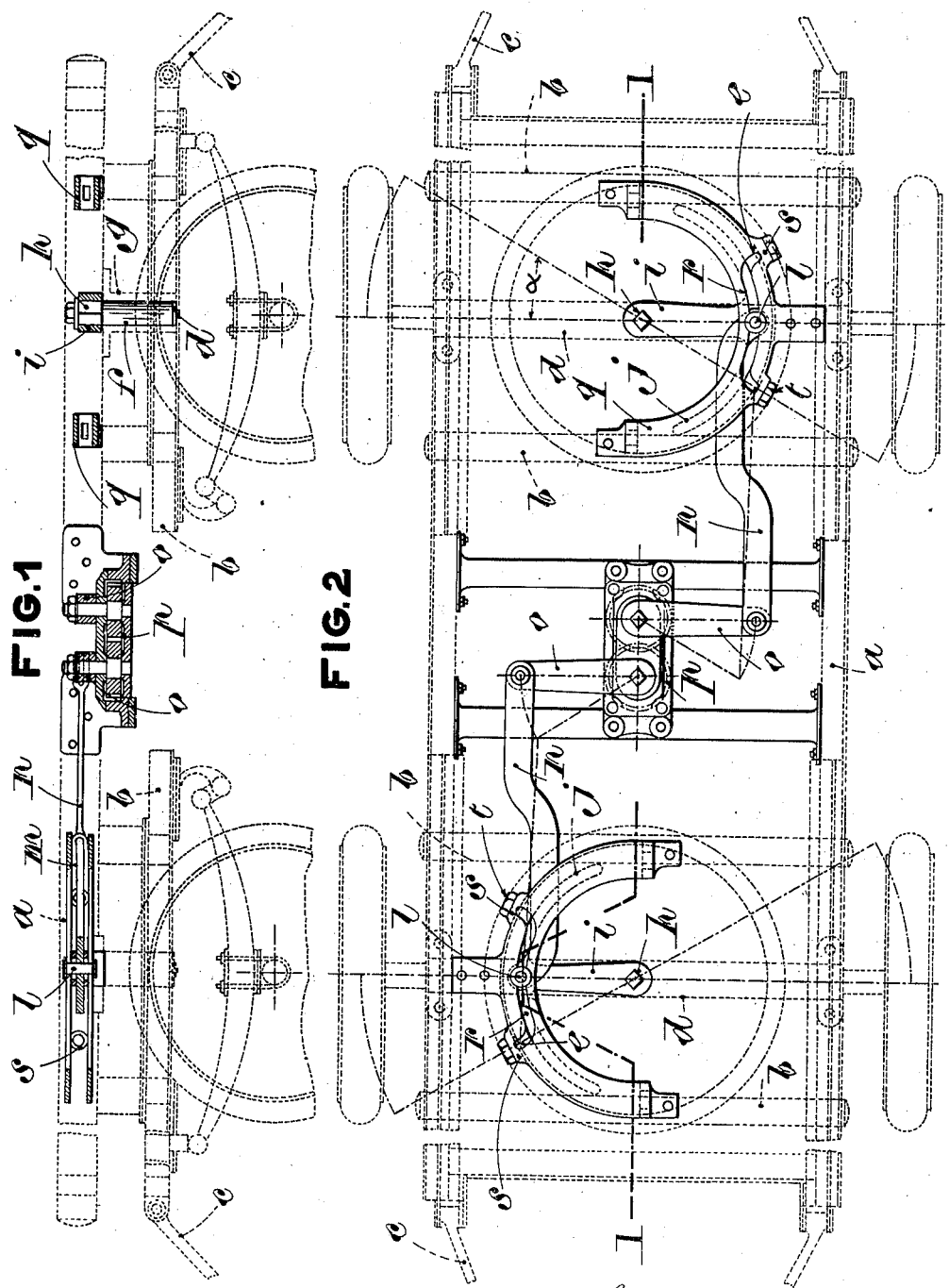
Inventors
Joseph Coder and
Louis Coder
By — B. Singer, atty.

Sept. 7, 1926.
J. CODER ET AL
1,598,675
TRAILER HAVING FOUR STEERING WHEELS
Filed Oct. 9, 1925    2 Sheets-Sheet 2
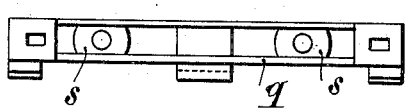
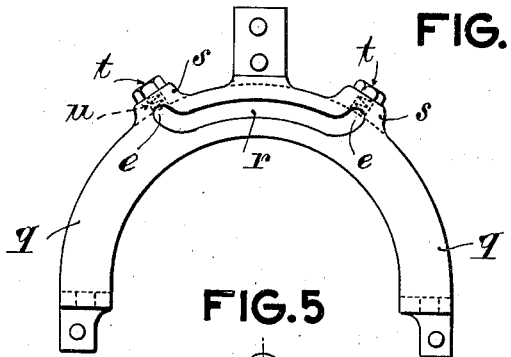
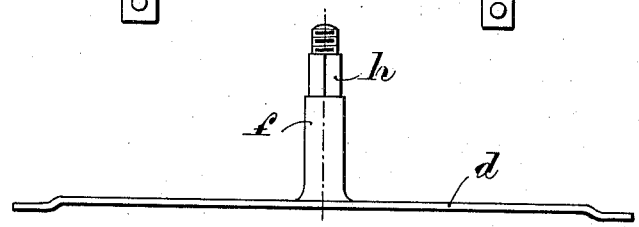
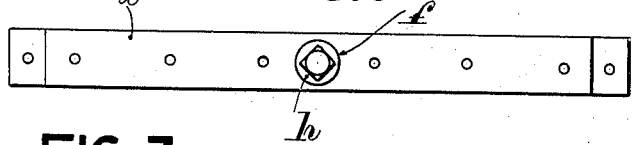
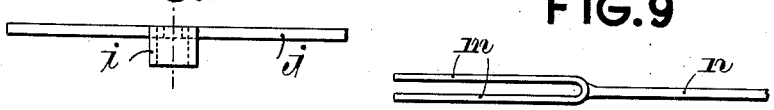
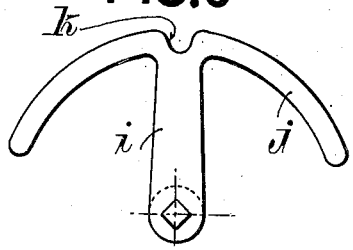
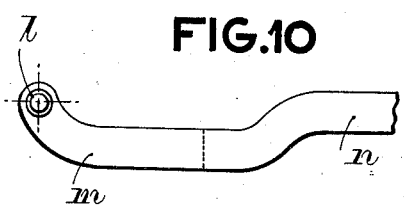

Patented Sept. 7, 1926.

1,598,675

UNITED STATES PATENT OFFICE.

JOSEPH CODER AND LOUIS CODER, OF MARSEILLE, FRANCE.

TRAILER HAVING FOUR STEERING WHEELS.

Application filed October 9, 1925. Serial No. 61,551.

Ordinary trailers widely used throughout the world do not come up to the actual needs of transport enterprises owing to the fact that their steering is incorrect and the difficulties as to their operation when formed into trains.

All types of trailers having four steering wheels which have been used do not solve the question of fact that the angle through which each axle can turn is limited, the whole train only turning on a relatively large radius.

The present invention overcomes these inconveniences and relates to a trailer having four steering wheels capable of being yoked to travel in either direction and composed of a chassis carried by two under carriages, the controlled under carriage in order to avoid over balancing only turning through a predetermined angle.

The invention will be described with reference to the accompanying drawings.

Fig. 1 is a section on line 1—1 Fig. 2.
Fig. 2 is a plan.
Fig. 3 is an elevation of the stationary quadrant.
Fig. 4 plan of same.
Fig. 5 is an elevation of the locking pin.
Fig. 6 is a plan of same.
Fig. 7 is an elevation of the moving quadrant.
Fig. 8 is a plan of same.
Fig. 9 is an elevation of coupling rod.
Fig. 10 is a plan of same.

A chassis $a$ is carried at the ends by two under carriages $b$ which are each capable of being yoked to the driving vehicle at either end by the shafts or couplings $c$. Each of the under carriages $b$ is formed with a T shaped member $d$ affixed to the central cross member forming a locking pin, its vertical axis $f$ being pivoted in a bronze bearing $g$ the pin having a polysided head $h$ (shown square in Figs. 5 and 6 of the drawings) to engage a lever $i$ (Figs. 7 and 8) for operating it. At one end this lever is affixed to a quadrant $j$ of predetermined radius formed with a notch $k$ into which a pin $l$ travelling between the forks $m$ of a connecting rod $n$ can enter; the other end of this fork $n$ is connected through a lever $o$ to a gear box $p$.

A double stationary quadrant $q$ inside which the movable quadrant $j$ can turn is affixed to the chassis corresponding to each under carriage $b$. The quadrant $q$ is formed with a segmental slot or groove $r$ in which the pin $l$ of the fork $m$ of the connecting rod $n$ enters. Two recesses $e$ are formed one at each end of this slot $r$ eccentric thereto and of the same size as the notch $k$ in the quadrant $j$. Two hollow tapped bosses $s$ are formed on the outer periphery of the quadrant opposite the recesses $e$. Each boss is occupied by a threaded stud $t$ under which is arranged a spring $u$ against which it bears. The length of the slot $r$ is determined by the range of the connecting rod $n$.

The two under carriages $b$ being symmetrical, their movement is the same and they work in the following manner.

The change of direction can be communicated by any shaft or coupling $c$ when the corresponding under carriage $b$ will pivot with its T shaped member $d$ in the bronze bearing $g$. The square head $h$ will turn the lever $i$ and hence also the movable quadrant $j$, and by reason of the engagement of the pin $l$ in the recess $k$ upon the connecting rod $n$. The movement of this rod $n$ is transmitted to the other under carriage through the gear box $p$. In this way the movement of the two under carriages is similar, but in opposite directions as long as the lever $i$ of the controlled under carriage does not arrive at the end of the slot $r$ in the double stationary quadrant $q$. As soon as the pin $l$ reaches the end of the slot $r$ it leaves the notch $k$ and enters the recess $e$ compressing the spring $u$. When this occurs the movable quadrant $j$ can continue its movement without acting on the connecting rod $n$ the pin $l$ remaining motionless in its new position.

After turning through a predetermined angle $x$ for example the controlled under carriage is thus rendered free and independent of the under carriage which operated it so that this latter is completely independent of it and is subject only to the draft stress of the truck or car connected to said rear under carriage.

On the return movement when the notch $k$ in the pivoted quadrant $j$ comes opposite the pin $l$ this under the action of the spring $u$ enters it and thus relocks the two under carriages which move together again, the spring $u$ being held in the notch by the plain portion of the quadrant $j$ which slides over it.

If in actual use a chassis, such as is supported by two axles, which coupled to each other in such a manner that they can simultaneously turn about their respective axes $h$, one is obliged to limit the angle to which the one and the other axle may be turned.

In fact, if both axles could turn to the extent of 90°, the chassis would tip over, because the points of contact of the four wheels with the ground, would be naturally located upon the same straight line.

The present invention has as its object the provision of a trailer, the front axle of which can turn to any angle, even in excess of 90° with respect to the axis of the trailer, while the turning of the rear axle in the reverse direction ceases when the inclination of the rear axle attains a predetermined value with respect to the main axis of the trailer. The device which is the subject matter of this special invention has for its object to connect rigidly the two axles during a certain angular displacement and then to loose this connection after the angular displacement passes over a predetermined value.

It is to be noted in addition, that the two devices, used for mounting each of the axles, are absolutely identical and symmetrical, so that of the two axles either at will can be actually used as the front axle.

Hence the trailer thus formed may be steered from either of the two under carriages either of which produces the same displacement of the other.

Details of construction of the parts of the arrangement may be varied to suit different types of vehicle.

What we claim as our invention and desire to protect by Letters Patent is:—

1. A trailer having four steering wheels comprising in combination two axles, two road wheels mounted on each axle, two under carriages supported by the axles, a chassis carried by the under carriages, a pin on each under carriage about which it can rotate, links connecting the under carriages, means for yoking the under carriages to the driving vehicle, means for allowing the foremost under carriage to pivot for turning about a small radius and means for limiting the rotation of the rearmost under carriage to a predetermined angle to maintain the stability of the vehicle.

2. A trailer having four steering wheels as in claim 1 comprising a stationary locking pin affixed to the axle, a lever connected thereto, a quadrant on the end of the lever, a pin adapted to engage a notch therein, a coupling rod affixed to the pin, a double stationary slotted quadrant carried by the chassis and engaged by the pin, bosses on the peripheries of the quadrant opposite the ends of the slot housed in the bosses and projecting into the slot to engage the pin at either end of its travel, a gear box mounted between the two under carriages and coupling rods connecting the pivoted quadrants to the gear box.

In witness whereof we affix our signatures.

JOSEPH CODER.
LOUIS CODER.